INVENTOR
George C. Sziklai
BY
[signature]
ATTORNEY

June 23, 1953 G. C. SZIKLAI 2,643,289

TELEVISION SYSTEM

Filed Aug. 31, 1949 3 Sheets-Sheet 2

INVENTOR
George C. Sziklai
BY
ATTORNEY

June 23, 1953 G. C. SZIKLAI 2,643,289

TELEVISION SYSTEM

Filed Aug. 31, 1949 3 Sheets-Sheet 3

INVENTOR
George C. Sziklai
BY
[signature]
ATTORNEY

Patented June 23, 1953

2,643,289

UNITED STATES PATENT OFFICE 2,643,289

TELEVISION SYSTEM

George C. Sziklai, Princeton, N. J., assignor to Radio Corporation of America, a corporation of Delaware Application August 31, 1949, Serial No. 113,318

13 Claims. (Cl. 178—5.2)

This invention relates to a system and method for simultaneously transmitting a plurality of sets of information and may be useful in color television.

It is highly desirable that color television systems be compatible with present television standards in order that the present monochrome receivers, which produce black and white images, will not be made obsolete.

In order to make efficient use of the frequency band that may be available, it is possible to transmit a single voltage wave that is coded so that it contains simultaneous information as to the relative intensities of the component colors required to produce a colored image. Were it not for the requirement of compatibility and for the distortion usually present in any transmitted voltage wave, various values of the transmitted voltage wave could be assigned at random to the ratios of component color intensities.

However, it is obvious that the transmitted voltage wave must substantially conform to the light intensity in the scanned object if black and white receivers now in use are to reproduce an acceptable black and white image from the coded transmission.

Noise, multipath and other sources of interference produce distortion in the transmitted voltage wave and make it necessary to have proximate values of the transmitted wave correspond to color shades that are very much alike. Otherwise, a slight distortion might, by way of illustration, cause the receiver to produce red when the actual scene was green.

This invention makes possible the transmission of colored images in such manner that the requirements of compatibility and freedom from color dilution in the presence of distortion are adequately met.

Briefly, this is achieved by coding the transmitted wave within predetermined levels in such manner that as the wave increases, the intensity of a first color component decreases while the intensity of another component increases. When the transmitted wave passes through another predetermined level, the intensity of only one of the color components is increased. From this point to the next level the intensity of the first color is gradually increased while the intensity of the other color is decreased.

As applied to a color receiver built in accordance with the teachings of this invention, this means that the overall intensity of the reproduced colored image will remain constant in the region between each set of levels. This is so because the reproducers of each component color are operating continuously so that the intensity of their combined images is necessarily equal to the sum of their individual intensities. However, the color shades can be varied within each range. At the end of a range the intensity of the image formed by a reproducer of one of the component colors is increased so that a new intensity level is reached.

As applied to receivers now in use, the black and white image that they reproduce in response to a transmitted wave that is coded in accordance with the teachings of this invention changes in intensity as the transmitted wave changes in value and, therefore, its intensity is not constant as the value of the transmitted wave passes through any given range, but this is not harmful providing there is not too much difference between the signal levels at the ends of a range.

According to another aspect of the invention, it is possible to transmit pleasing colored images with fewer intensity levels by eliminating certain color combinations.

Although the invention is illustrated by reference to a color television system, it will be apparent to those skilled in the art that the novel principles disclosed may be employed in the transmission of any desired signals whether they are related or not.

The object of the invention is therefore to provide an improved means and method whereby a plurality of signals can be simultaneously transmitted with maximum fidelity in the presence of distortion of the transmitted signal.

A still further object of the invention is to provide an improved means and a method whereby the number of levels necessary to produce a pleasing colored image may be substantially reduced.

Another object of the invention is to transmit video signals so that they can be reproduced in black and white by standard receivers with minimum errors in brightness and at the same time be reproduced in color by receivers constructed in accordance with this invention with minimum color dilution.

These and other objects will be apparent from a consideration of the following figures in which.

Figure 1:
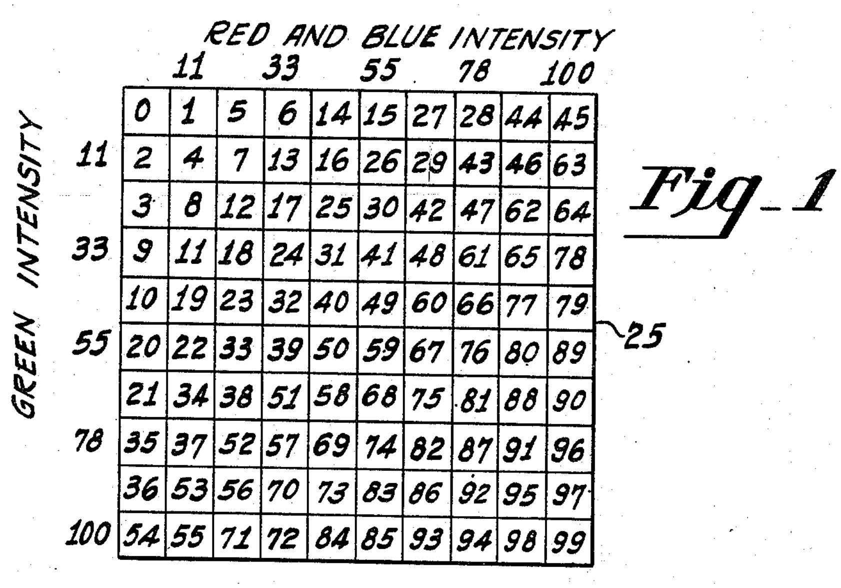
Figure 1 illustrates a code for use with signal transmission systems that is the subject of this invention.

Reference is made to the coding system of this invention, as illustrated in Figure 1, in which the successive levels of signal intensity, indicated by the numerals within the small rectangles, proceed back and forth along the diagonals of the larger rectangle within which they are enclosed. The intensity of the green component increases in a downward direction and the intensity of the red and blue components increases to the right. The horizontal position is first representative of the blue content and then of the red, as those two colors may be multiplexed in any known fashion.

The effect of noise or other distortion on such a code can be appreciated by assuming, for example, that the true level of the transmitted voltage wave corresponds to the level 17 and that distortion changes it to a level 18. Only a small amount of color error is thus introduced as the red and blue content drops from the third level to the second, and the green increases from the second level to the third. Thus, the probability of going from one saturated color to another is substantially eliminated. Furthermore, the total intensity or brightness of the colored image remains constant within a predetermined range as the sum of the red, blue and green components is the same, the loss in red and blue intensity being compensated for by the increase in green intensity.

For purposes of convenience, each of the successive levels of the signal, as represented by the numerals within each small rectangle, is hereby defined as a color-brightness level, as it represents a unique combination of the intensities of the component colors. In the central area of the rectangle a change in the color-brightness levels represents a given increase in intensity of one component color and a similar decrease in another so that the total brightness produced by the different colors remains substantially the same. At the edges of the system of targets, however, where either of the color components is either zero or saturated, a change in the color-brightness by one level may cause one color alone to change in intensity without changing the other so that a change in the total brightness level is brought about. Thus, levels 1 and 2 are in a first total brightness level, 3 through 5 another, etc.

Apparatus for coding the signal in the manner discussed above is illustrated in Figure 2. Video signals corresponding to the various color components are derived at color camera 2 and supplied to the leads 4, 6 and 8, respectively. A special type of coding tube having an envelope 10, an electron gun structure 12, a control grid 14, and two sets of deflecting plates 16 and 18 is provided with a mosaic 25 composed of separate rectangular targets 24 arranged in horizontal and vertical rows, as indicated in Figure 1. Each target 24 may be connected in parallel to a common output lead 26 in such fashion that the response to the electron beam is proportional to the level indicated by the numbers in the small squares of Figure 1. In other words, each small rectangle in Figure 1 corresponds to a target which provides a signal to lead 26 in the presence of the beam that is proportional to the number therein. The means for producing a signal required by the code at the various targets may comprise potentiometer 28 as shown or properly biased amplifiers connected between each target 24 and the lead 26.

The green video signals are connected to the vertical deflection plates 16 via lead 4 and deflect the beam downward as the green intensity increases. The red and blue signals are alternately supplied to the plates 18 by multiplexer 34 via lead 36 so that the beam is deflected to the right as the strength of the red or blue signals increases. In order to insure the beam hitting the upper left-hand square of Figure 2 when no signal is present on either set of plates, biasing potentiometers 37 and 38 may be provided. The beam is accordingly brought to a coordinate position determined by the intensities of the signals supplied to the two sets of deflecting plates, and a voltage of a level corresponding to the numeral within that target struck by the beam is supplied to output lead 26. The output lead 26 is connected to any suitable transmission system.

Apparatus and methods of receiving and decoding the signals transmitted as described above are now discussed. The signals supplied by lead 26 to the transmission system may be detected by any standard receiver 42 shown in Figure 3 and supplied to another special cathode ray tube 43 which is used to decode the signal.

The tube 43 comprises an envelope 44, an electron gun 46, a control grid 48, and electron beam deflection plates 52. The electron beam formed by the gun 46 is a flat horizontal type such as may be produced by the gun structure disclosed in U. S. Patent No. 2,434,713 issued on January 20, 1948 to Mueller, and is moved up and down by the signals applied to the deflection plates 52 so as to scan the targets 53 and 54, illustrated in detail in Figure 4.

The targets may be two separate vertical strips, strip 53 being connected to the green image reproducing channel 55 and strip 54 being connected to multiplexer 56 which successively applies the signal to the red reproducing channel 57 and the blue reproducing channel 58. A mask 60 is placed between the targets or strips 53 and 54 and the gun 46 so as to permit a desired portion of the electron beam to strike the targets at vertical positions determined by the received signal. A biasing means 62 is connected to the plates 52 so that the beam is at its uppermost position indicated by the numeral zero when no signal is present.

Upon receipt of the signal having an amplitude of one unit, for example, the beam is moved down to the level on the target indicated by the same number so as to pass through the aperture 64 in the mask 60 that is located opposite the red and blue target 54. If, on the other hand, a signal having an amplitude of 4 is applied to the deflection plates 52, the beam is deflected to a position opposite numeral 4 in Figure 4, and both targets 53 and 54 are struck by the electron beam through apertures 66 and 68.

The magnitude of the signals provided by the targets 53 and 54 in response to the electron beam is determined by the horizontal dimensions of the apertures. For example, it will be noted that the apertures 70 and 72 at levels 3 and 5 respectively are twice the size of the apertures shown at level 1. Inasmuch as twice the width of beam strikes the targets 53 and 54 through these apertures, twice the amplitude of signal is provided to the control electrodes of the partial image reproducing cathode ray tubes. Thus, in accordance with the code shown in Figure 1, level 3 corresponds to 22 percent green intensity and level 5 corresponds to 22 percent red intensity.

Figure 2:
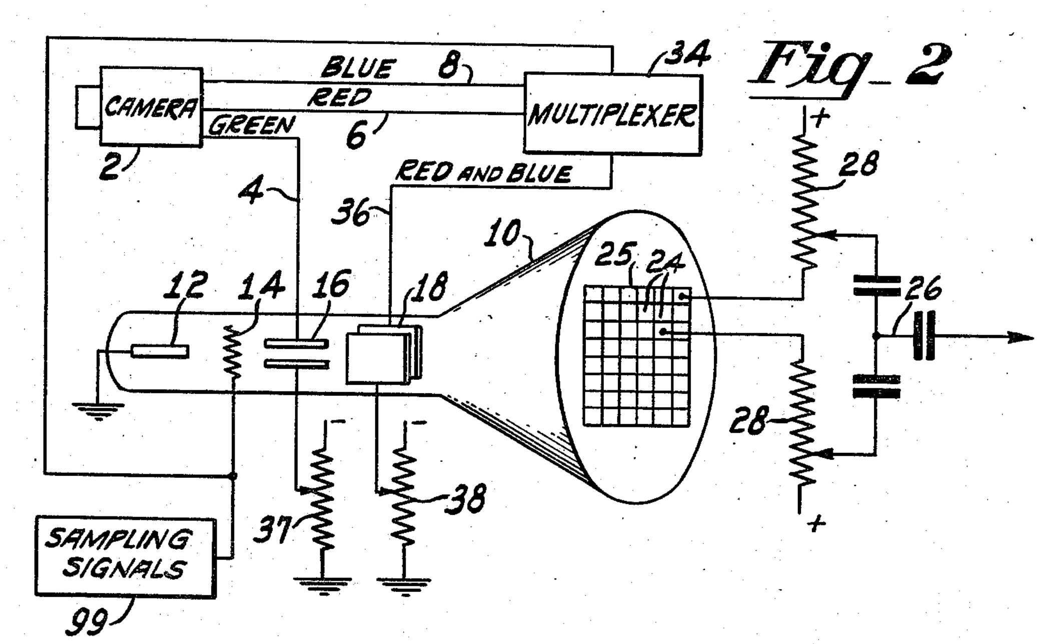
Figure 2 shows a transmission system including a special tube for coding information in accordance with this invention.
Figures 5, 6A:
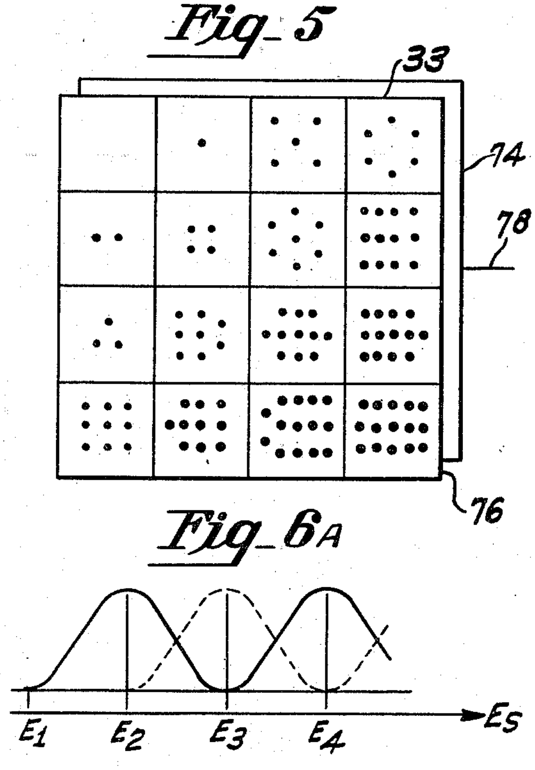
Figure 5 illustrates an alternative type of target that may be used in a coding tube.
Figure 6A illustrates the operation of the device shown in Figure 6.

Figure 5 shows a target 74 and a mask 76 that may be substituted for the target 24 shown in Figures 1 and 2 in such manner as to eliminate the necessity for a plurality of circuits being tied in parallel to the output lead 26. The target 74 is a single sheet of conducting material and is connected to the output 26 by a single lead 78. Various areas of the mask 76 correspond to rectangles 24 of the target 25 shown in Figures 1 and 2 and each of these areas is perforated so as to allow more of the electron beam to reach the target 74 as the color-brightness level indicated by the code in Figure 1 increases in value. In other words, a single opening may be provided for a color brightness level 1 and two such openings provided for color-brightness level 2, etc.

Figures 3, 4, 8:
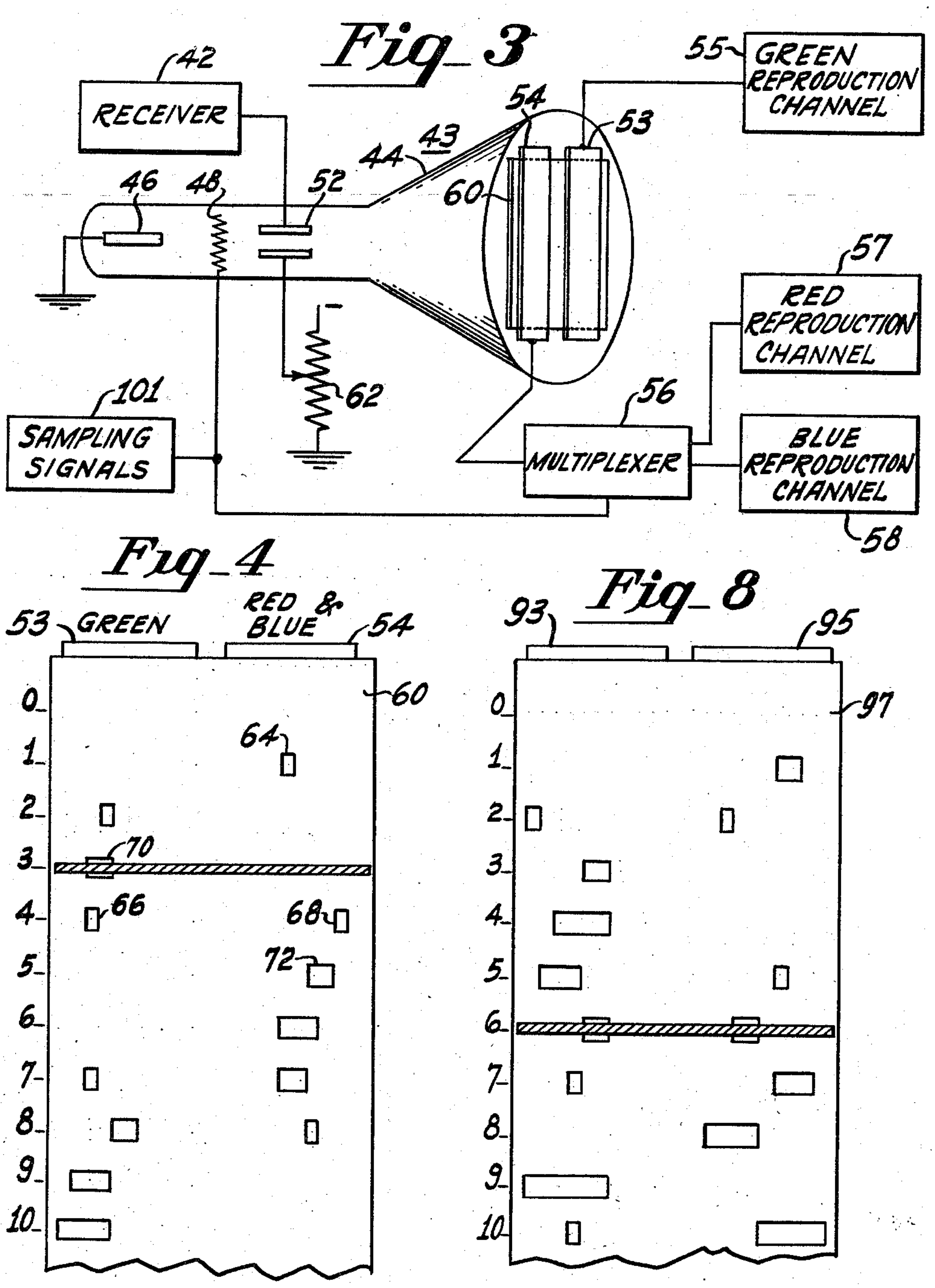
Figure 3 shows in schematic form a receiver adapted to analyze the code of this invention.
Figure 4 shows the target used in a special cathode ray tube at the receiver for analyzing a signal coded in accordance with this invention.
Figure 8 shows the type of target used in a receiver when the signal is coded in accordance with the target shown in Figure 7.
Figure 6:
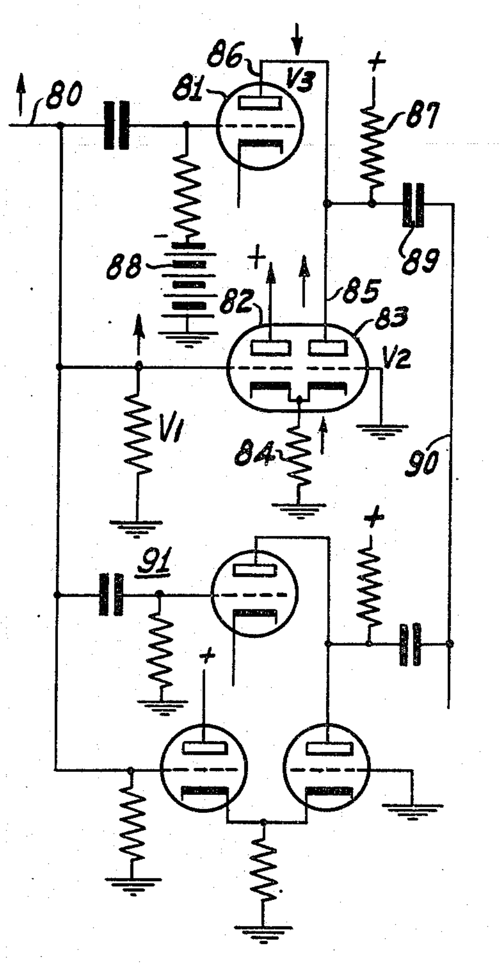
Figure 6 shows a circuit for decoding the signals at the receiver.

An electronic circuit for decoding the information at the receiver that may be substituted for the decoding tube 43 of Figure 3 is illustrated in Figure 6. The coded signal is applied to two channels, the output of one being connected to the green image reproducing channel 55 of Figure 3, and the output of the other being connected to the multiplexer 56. Each of these channels is comprised of a plurality of stages that produce an output signal that increases during one range of input signal and decreases during the next. Stages in the two channels that operate during successive ranges of applied signals are so biased as to produce outputs that are 180 degrees out of phase. This means that the output of one channel is increasing as the output of the other channel is decreasing as is required. For purposes of simplicity, only two stages of one channel are shown and described.

A signal coded in accordance with the teachings of this invention is supplied via channel input lead 80 to the grids of amplifiers 81 and 82. Amplifier 83 is cathode coupled by common resistor 84 to amplifier 82 and its plate 85 and the plate 86 of amplifier 81 are tied together through a common load impedance 87 to a source of fixed B+ potential.

These elements constitute a first stage which operates as follows: When no signal is present on lead 80, tube 81 is biased to cut-off and tube 82 conducts sufficiently so that the voltage at the plates 85 and 86 may be half the B+ value. As the signal increases through the first range ($E_1 \rightarrow E_2$) of Figure 6A which would be levels 1 and 2 of Figure 1, the increased conduction of tube 82 gradually increases the bias on tube 83 with the result that the plate voltage gradually increases to B+, as shown in Figure 6A. At the beginning of the second range ($E_2$—$E_3$) the bias established at the grid of tube 81 by a source of fixed negative potential 88 is overcome and tube 81 begins to conduct with the result that its plate voltage gradually decreases to a minimum point determined by saturation. This alternating voltage is coupled by condenser 89 to a common output lead 90 of the channel that is, in turn, connected to channel 55 of Figure 3.

Other similar stages are connected in parallel with the one described as generally indicated by numeral 91. The biases are so arranged that the voltage relationships are not changed until the tube in the previous stage corresponding to tube 81 is saturated, at which point it operates in a manner just described. The other channel is comprised of a similar group of stages that are biased so as to operate as indicated by the dotted line of Figure 6A. Thus, as the output of one channel is alternately increasing and decreasing, the output of the other channel is alternately decreasing and increasing in accordance with the code.

Figure 7:
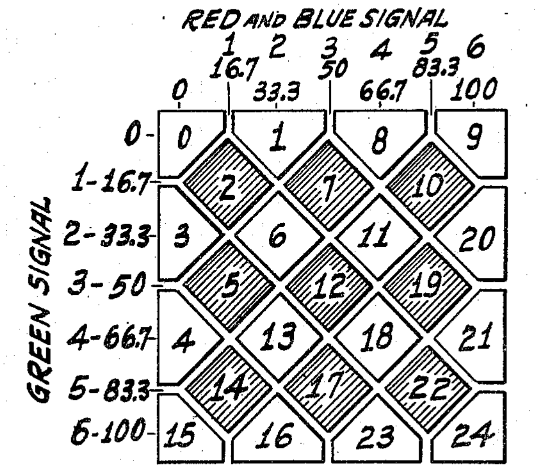
Figure 7 shows a type of target for use in a special coding cathode ray tube that permits a reduction in the number of levels of brightness.

For the purpose of reducing the number of levels of color-brightness required, a target such as illustrated in Figure 7 may be employed at the transmitter in place of the target 24 shown in Figures 1 and 2. Instead of 100 levels of color-brightness there are only 24. A compromise is therefore made in that there are not as many combinations of the intensities of the component colors, and certain color intensities cannot be obtained in a highly saturated condition but must be combined with various intensities of another color.

The inner targets are rectangular or diamond-shaped with their diagonals running horizontally and vertically with respect to the target as a whole. The triangular niches between the outer diamonds and little areas beyond may be filled in with targets of a shape approximated by superimposing a triangle on a rectangle in such manner that one side of each coincides. Coded signal responses are obtained in the same manner as was explained in connection with Figures 1 and 2.

Referring again to Figure 7, the numerals within the diamonds correspond as before to the level of the signal to be produced when the electron beam strikes a particular target. The unshaded targets represent those intensities of the component colors that can be obtained in a highly saturated condition and combinations of these. For purposes of simplification, these targets are located at intersections of the even numbered coordinates. However, intersections of the odd numbered coordinates indicate shaded targets that cannot produce their corresponding intensities in a single component color but only in combinations with each other. Thus, 16.7 percent green can be obtained in combination with 16.7 percent, 50 percent and 83.3 percent of red or blue, but cannot be obtained by itself.

In this way, four highly saturated levels of green or red and blue may be obtained, but three additional levels of each are available with slight dilution.

At the receiver, the signal thus transmitted is decoded by a special cathode ray tube that is similar to that illustrated in Figures 3 and 4, the target and mask of Figure 8 being substituted for the target of Figure 4. The targets 93 and 95 for such a tube are shielded by a mask 97 which has no openings opposite zero level, two single openings opposite level 2, etc. so that the amount of the flat horizontal beam that is permitted to reach each target is proportional to the level of the green and red or blue represented by the coded voltage wave.

For the sage of simplicity, variations in construction of apparatus for coding signals in accordance with the principles of this invention have not previously been discussed, but a few of them will now be explained.

Instead of using a special transmitting tube having a plurality of targets, it is possible to employ an ordinary cathode ray tube, by placing an optical wedge between the face of the tube and a photoelectric cell that is coupled via output lead 26 to the modulator. If the wedge is properly shaded at the various coordinate points on its surface, the light produced by the fluorescent material on the face of the tube may be modulated in accordance with the desired code. For example, if a wedge were used in connection with the code of Figure 1, it would range in light transmission qualities from black in an area corresponding to the small square containing the numeral 0 to transparent at square bearing numeral 99.

A similar device could be used as a decoder at the receiver as it would only be necessary to deflect a flat ribbon beam in one direction in response to the level of the received signal and to permit an amount of light to pass that is proportional to the amount of beam that gets through the apertures in masks 60 and 97. Of course, it would be necessary to substitute two separate photoelectric cells for the targets 93 and 95, one connected to the means for forming the green content of the image and the other successively connected to the means for forming the red content of the picture and the means for forming the blue content of the picture.

Although such systems are more easily understood when explained in relation to amplitude modulation, the invention is not limited to any particular type of signal transmission. For example, if frequency modulation were employed, the various levels correspond to levels of frequency, and if phase modulation is employed, the levels would refer to various levels of phase.

It may be desirable to pulse or sample the information to be transmitted, in which case a source of sampling signals 99 may be connected to the grid 14 of a coding tube of the type shown in Figure 2 and to the multiplexer 34. At the receiver a source of similar sampling pulses 101 may be connected to the grid 48 of the decoding tube 43 shown in Figure 3 and to the multiplexer 56. It will be apparent to those skilled in the art that whether or not this is done will not impair the advantages to be derived by employing the methods herein described.

This invention is a marked step forward in the art of signal transmission because it allows two separate signals to be transmitted in such manner that any distortion of the signals produces a minimum effect on either. As applied to color television, this means that errors in color and brightness are reduced to a minimum and, at the same time, that images reproduced from said signals by present black and white receivers will be of high quality.

Having described my invention, I claim:

1. An apparatus for transmitting at least two sets of intelligence comprising means for deriving a first voltage wave corresponding to a first intelligence, means for deriving a second voltage wave corresponding to a second of intelligence, electronic means adapted to develop a third voltage wave in response to said first and second voltage waves such that increasing values of said third voltage waves represents an increase in the sum of said first and second voltage waves in a step fashion as well as the ratio between them.

2. A color transmission system in which a number of different colors of different brightness and saturations are transmitted comprising a means for developing a first voltage wave having a characteristic thereof varied in accordance with a first color content produced by scanning an object, means for developing a second voltage wave having a characteristic thereof varied in accordance with a second color content produced by scanning the object, and means for assigning successive values of a given characteristic of a third voltage wave in such manner that successive groups of values correspond to successive total brightness levels, and each successive value represents a change in one color in one direction and a change in the other color in the opposite direction.

3. A system for transmission of a plurality of signals comprising a means for developing a first signal corresponding to a first intelligence, a means for developing a second signal corresponding to a second intelligence, means responsive to the first and second signals so as to provide a third signal having a characteristic thereof variable through a plurality of values, each of said values corresponding to a predetermined combination of the magnitudes of said first and second signals, said combination being such that adjacent values indicate changes in one signal in one direction and changes in the other in the opposite direction except where the change is in such a direction as to decrease one of said signals below zero or above its maximum, in which case the other of said signals alone is changed.

4. A system for transmitting a plurality of conditions of color-brightness comprising a first source adapted to produce voltage waves having a characteristic thereof varying in accordance with the intensity of a first primary color as an object is being scanned, a second source adapted to produce voltage waves having a characteristic thereof varied in accordance with the intensity of a second primary color as an object is being scanned, a third source adapted to produce voltage waves having a characteristic thereof varied in accordance with the intensity of a third primary color as the object is being scanned, coding means for developing a coded voltage wave in response to said voltage waves, each level of said coded wave representing a particular color-brightness determined by the voltage waves produced by any two of said sources, means for connecting the output of the first of said sources to said coding means, means for successively connecting the outputs of the second and third sources to said coding means.

5. An apparatus for transmitting colored images comprising a first means for deriving video signals related to a first color, a second means for deriving video signals related to a second color, a cathode ray tube, an electron gun mounted in one end of said tube, a first beam deflecting means, a second beam deflecting means, connections between said first means and said first beam deflecting means, connections between said second means and said second beam deflecting means, a plurality of targets mounted within said tube, and means associated with each of said targets for developing voltages, in response to electrons from said gun, of different levels of increasing value starting at one corner target and progressing back and forth along the diagonals of the rectangle.

6. An apparatus for decoding a signal having different values thereof corresponding to different combinations of the magnitudes of at least two functions comprising an input circuit to which said signals may be applied, a first output circuit, a second output circuit, means connected between said input circuit and said first output circuit for conducting energy therebetween, said means being adapted to conduct increasing amounts of energy as said signal increases within a given range, means connected between said input circuit and said second output circuit for conducting energy therebetween, said latter means being adapted to conduct decreasing amounts of energy as said signal increases within said given range.

7. An apparatus for decoding a signal having different values thereof corresponding to different combinations of the magnitudes of at least two functions comprising an input circuit to which said signals may be applied, a first output circuit, a second output circuit, means included in said first output circuit for controlling the energy flowing therein in response to the signals applied to the input circuit, said means being adapted to conduct increasing amounts of energy as said signal increases within a given range, means included in said second output circuit for controlling the energy flowing therein in response to said signals, said latter means being adapted to conduct decreasing amounts of energy as said signal increases within said given range.

8. A coding tube comprising an envelope, an electron gun adapted to project a beam of electrons mounted within said envelope, means for deflecting said beam in a horizontal direction, means for deflecting said beam in a vertical direction, a plurality of targets mounted within said envelope, said targets being located at points determined by a system of horizontal and vertical rectangular coordinates, and leads from each of said targets extending through the envelope.

9. A coding device comprising a coding tube such as described in claim 8 in which means for developing a signal of a predetermined magnitude are connected to each of said targets, said means being so adjusted that signals of increasing value are produced as the electron beam deflected in a given direction along targets located on one diagonal of said rectangular coordinate system, and signals of increasing value are produced as the beam is deflected in the opposite direction on an adjacent diagonal.

10. A coding device comprising a coding tube such as described in claim 8 in which means for developing a signal of a predetermined magnitude is connected to each of said targets.

11. A decoding tube comprising an envelope, an electron gun mounted within said envelope, said gun being adapted to project a flat horizontal beam of electrons, a first target mounted within said tube, a second target mounted within said tube, a first mask mounted between the electron gun end of the first target, said mask having means defining openings therein, the horizontal dimension of the openings thus formed increasing within a given range of vertical deflection of the beam and decreasing within ranges adjacent said given range, a second mask mounted between the electron gun and the second target said latter mask having means defining openings therein, the horizontal dimension of the openings thus formed decreasing within said given range of vertical deflection and increasing within said adjacent ranges, and separate leads connected to each of said targets and extending through said envelope.

12. A device for transmitting colored images comprising means for generating video signals related to partial images of a plurality of colors of a scanned object, means for developing a voltage wave in response to said video signals that has a plurality of values, certain predetermined groups of these values lying within successive total brightness levels determined by at least two of the partial images as indicated by said signals, the first and last levels and alternate intermediate levels within at least some of said groups corresponding to combinations of a first set of values of at least two signals, the levels intermediate said latter levels of a given total brightness level being related to combinations of a second set of values of at least two signals.

13. A transmission system for transmitting different values of three primary colors comprising means for deriving a video signal corresponding to a first primary color, means for deriving a video signal corresponding to a second primary color and means for deriving a third signal corresponding to a third primary color, said video signals contemporaneously corresponding to the respective color content at the same point of a scanned object, means for coding the ratio between any two video signals and their accumulated value, means for continuously applying the first signal to said coding means, and means for successively applying the second and third signals to said coding means.

GEORGE C. SZIKLAI.

References Cited in the file of this patent

UNITED STATES PATENTS

| Number | Name | Date |
|---|---|---|
| 2,272,638 | Hardy | Feb. 10, 1942 |
| 2,375,966 | Valensi | May 15, 1945 |
| 2,461,515 | Bronwell | Feb. 15, 1949 |
| 2,492,926 | Valensi | Dec. 27, 1949 |

FOREIGN PATENTS

| Number | Country | Date |
|---|---|---|
| 505,653 | Great Britain | May 11, 1939 |
| 524,443 | Great Britain | Jan. 14, 1939 |